No. 625,606. Patented May 23, 1899.
A. H. ROGERS & H. W. PATRICK.
BACK PEDALING BRAKE.
(Application filed Dec. 13, 1898.)
(No Model.) 2 Sheets—Sheet 1.
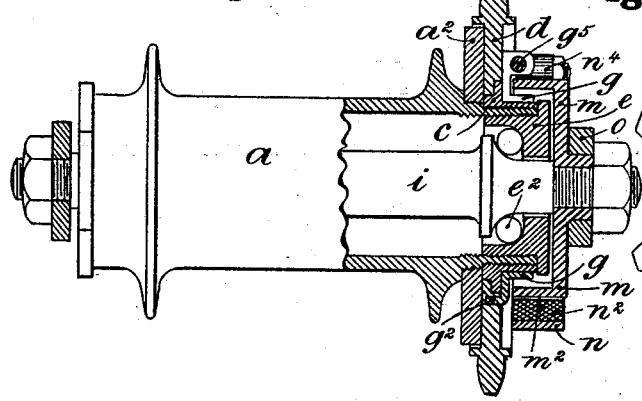
Fig.1. Fig.2.
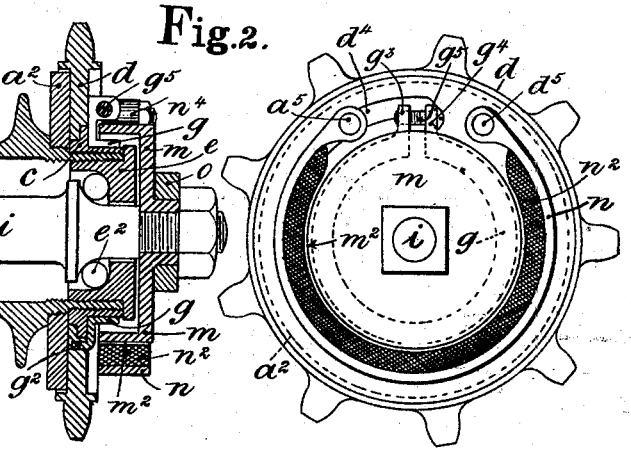
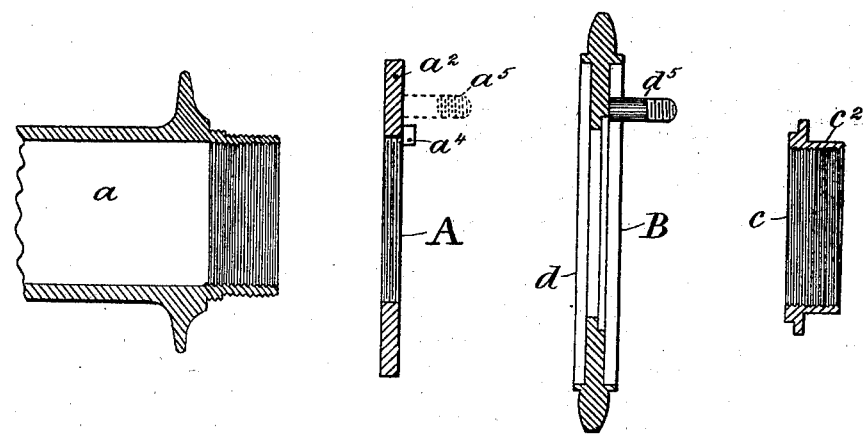
Fig.4.
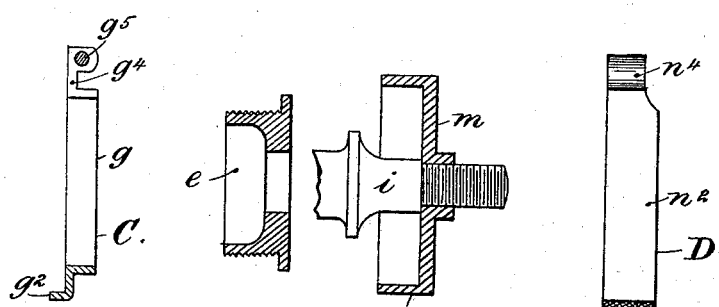
Witnesses
Inventors
Arthur H. Rogers
Henry W. Patrick
By James L. Norris No. 625,606. Patented May 23, 1899.
A. H. ROGERS & H. W. PATRICK.
BACK PEDALING BRAKE.
(Application filed Dec. 13, 1898.)
(No Model.) 2 Sheets—Sheet 2.

Witnesses
Inventors

UNITED STATES PATENT OFFICE.

ARTHUR HOUGHTON ROGERS AND HENRY WILLIAM PATRICK, OF BIRMINGHAM, ENGLAND.

BACK-PEDALING BRAKE.

SPECIFICATION forming part of Letters Patent No. 625,606, dated May 23, 1899.

Application filed December 13, 1898. Serial No. 699,180. (No model.)

*To all whom it may concern:*

Be it known that we, ARTHUR HOUGHTON ROGERS, cycle manufacturer, and HENRY WILLIAM PATRICK, manager, subjects of the Queen of Great Britain, residing at 58 Ludgate Hill, Birmingham, in the county of Warwick, England, have invented certain new and useful Improvements in Velocipede-Brakes; and we do hereby declare the following to be a full, clear, and exact description of the invention, such as will enable others skilled in the art to which it appertains to make and use the same.

This invention is an improved brake for velocipedes, and is of that class which are fitted to a wheel's center and are put into operation by arresting and holding the chain-wheel while the driving-wheel is in motion or by a back-pedaling action on the part of the rider. The putting into action of such a brake is practically automatic in consequence of a back-pedaling movement on the part of the rider being an instinctive one when it is desired to retard the forward movement of a velocipede.

The brake according to this invention is primarily characterized by a resilient band which encircles a stationary part of the wheel, so as to at times make frictional contact with it by closing in upon it, and which is controlled by a movement of the chain-wheel upon the rear hub and a tensioning-band or adjustable gripping-ring which governs the movement of the said chain-wheel on its mounting, so as to render it capable of either being easily turned or only turned with considerable force, and, secondarily, by the means with which the said bands or band and ring are indirectly connected the one to the other and fitted to the rear wheel's hub on the one side, so as to be operated by the retrograde movement of the chain-wheel.

The invention will be best understood when described in connection with the accompanying sheets of drawings, on which reference-letters are used to denote the various parts.

Figure 3:
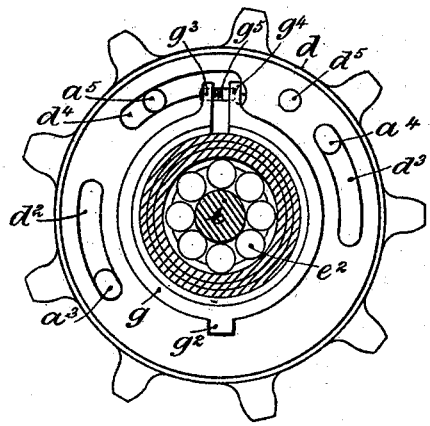
Figure 6:
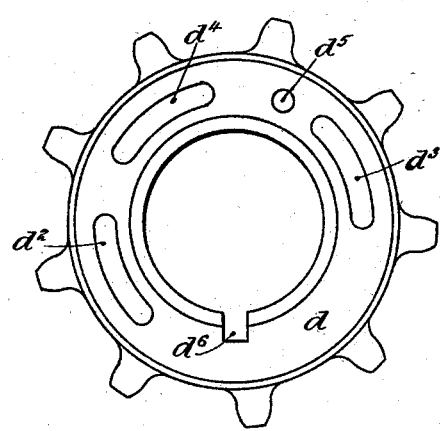
Figure 5:
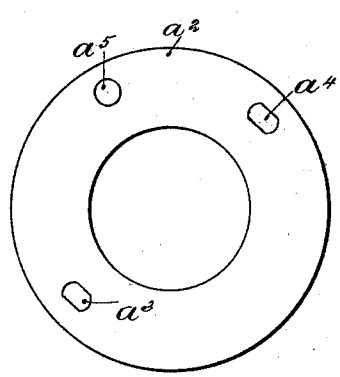
Figure 7:
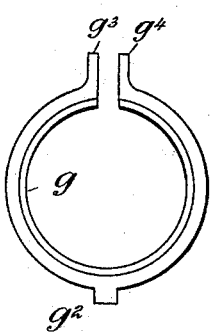
Figure 8:
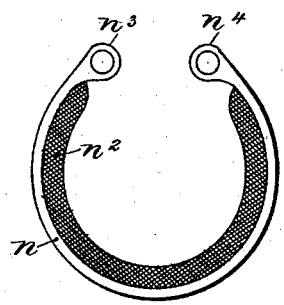

In the said sheets the invention is shown as applied to the one and chain-wheel side of the rear hub of a velocipede-wheel, Figure 1 being a longitudinal vertical section through the said hub on the chain-wheel side, the remaining part of the hub being shown in side elevation; Fig. 2, a side elevation, and Fig. 3 a side sectional elevation with some of the parts of the brake mechanism removed. In Fig. 4 the component parts of the brake mechanism as assembled in Fig. 1 are shown separated; and in Figs. 5, 6, 7, and 8 face views are shown of the parts A, B, C, and D in Fig. 4.

The hub $a$ upon its chain-wheel side has rigidly connected to it a carrier-plate $a^2$, which, although shown as a detachable part screwed upon the said hub end and locked in position by a ring-nut $c$, is for all practical purposes a fixture with the said hub end. This carrier-plate has upon its outer face two short studs $a^3$ $a^4$ and an outstanding pin or peg $a^5$, which respectively engage slots $d^2$ $d^3$ $d^4$, formed transversely through the side or web of the chain-wheel $d$, which latter is mounted, with its face to the carrier-plate, loosely over a portion of the exterior surface of the ring-nut $c$, before referred to, the said chain-wheel having a freedom of movement in respect of the carrier-plate $a^2$ equal to the length of the slots $d^2$ $d^3$, the said studs $a^3$ $a^4$, as aforesaid, forming stops to the chain-wheel's movement. This chain-wheel also carries upon its outer face an outstanding pin or peg $d^5$, similar to the one $a^5$ on the carrier-plate, and a cut-away part $d^4$ is formed within it near its bore, with which engages a projecting part $g^2$ of a split tensioning ring or band $g$, which is adapted to make frictional contact with a cylindrical part or collar $c^2$, formed upon the ring-nut $c$, which moves as one with the hub $a$, the said ring-nut being locked upon the hub's end by a disk $e$, which screws into the bore of the said hub's end and which forms half of a race for the antifriction-balls $e^2$ of the axle's bearing. This tensioning band or ring $g$ is rigidly connected to the chain-wheel by the projecting part $g^2$ and moves only with it, but it is also frictionally connected to the part $c^2$ of the hub (through the ring-nut $c$) by being closed in upon and around the said part $c^2$, so as to grip it, in consequence of which the chain-wheel's retrograde or backward movement is only possible by the exertion of sufficient force to turn the tensioning-ring $g$ upon the part $c^2$ of the ring-nut on which it is mounted. The free ends $g^3$ $g^4$ of the tensioning ring or band $g$ are coupled by a set-pin $g^5$, which passes through the one end and screws into the other and the screwing up of which effects a tighter grip of the said ring or band upon the part it surrounds. Thus it will be seen that the amount of force required to turn the chain-wheel backward can be adjusted by the simple operation of the set-pin $g^5$ to either cause the tensioning-ring to grip upon the parts $c^2$ it surrounds more or less, as may be needed, it being understood that in the forward movement of the said chain-wheel the hub and the tensioning-ring and the carrier-plate all rotate together.

It may be mentioned that the carrier-plate $a^2$ is right-hand screwed onto the hub, the ring-nut $c$, which locks it, left-hand screwed, and the disk $e$, which locks the ring, right-hand screwed, so that a multiple locking is effected. The axle or spindle $i$ carries upon it a cylindrical part $m$, around the periphery $m^2$ of which a resilient band $n$ takes, the said band always tending to close in automatically upon the said periphery. This cylindrical part $m$ is shown as engaging the extremity $o$ of the back-fork ends of the cycle's frame; but this is not necessary so long as it (the cylindrical part) is fitted to the spindle $i$ or the frame of a cycle, so as to constitute a non-rotating part. The resilient band $n$ is of hardened and tempered steel and is lined with leather or other suitable material $n^2$ of a breadth equal to that of the periphery of the cylindrical part $m$, and its free ends $n^3$ $n^4$ are respectively connected to the outstanding pins $a^5$ $d^5$ upon the carrier-plate and the chain-wheel, so that the grip of the said band $n$ upon the periphery of the part $m$ is controlled by the positions of the pins $a^5$ $d^5$ in respect of each other. For example, in Figs. 1 and 2 the resilient band $n$ is shown as free of the cylindrical part $m$, because the distance between the pins $a^5$ $d^5$ is sufficient to open the said band, this position of the pins being maintained against the closing-in tendency of the band $n$ by the greater frictional resistance the tensioning-ring $g$ offers against moving upon its mounting $c^2$. In the majority of cases this position is the normal one, as the brake is free and out of action and cannot be put into action without a back-pedaling movement to cause a slight retrograde movement of the chain-wheel $d$ upon its mounting in order to bring the pins $a^5$ $d^5$ closer together, and in order to do this the frictional resistance of the tensioning-ring $g$ must first be overcome by the back-pedaling action of the rider, the said frictional resistance being one capable of being adjusted by the screwing up or loosening out of the tensioning-ring's set-pin $g^5$.

In some cases the closing of the band $n$ may be so governed by the grip of the tensioning-ring upon the hub that immediately a forward-pedaling movement of a rider ceases the said band may grip the cylindrical part $m$, and thereby be retarded, while so long as a pedaling action is set up the said band $n$ is free, running around the said cylindrical part.

From the foregoing it will be obvious that the back-pedaling power required in order to bring into action the brake can be adjusted to any degree by the amount of the frictional grip of the tensioning-ring upon the surface of the hub it surrounds and that the same can be adjusted to suit a rider of any class.

Having now described our invention, what we claim, and desire to secure by Letters Patent, is—

In a brake for cycles, the combination with a driving-wheel and with a chain-wheel loose on the hub of said driving-wheel, of a cylindrical part screwed upon said hub, a carrier-plate rigid on said hub and having pins that lie in slots in the chain-wheel, a brake-band having one end connected to a pin on the chain-wheel and the other end connected to one of the pins on the carrier-plate, a fixed cylindrical part surrounded by said brake-band, a tensioning-ring carried by the chain-wheel, and having a tendency to close by its own elasticity upon the cylindrical part on the hub of the wheel, and a set-pin passing through one end of said ring and screwed into the other end, substantially as described.

In testimony whereof we affix our signatures in presence of two witnesses.

ARTHUR HOUGHTON ROGERS.
HENRY WILLIAM PATRICK.

Witnesses:
A. F. BIDDLE,
GEO. FUERY.